United States Patent
Mardilovich et al.

(10) Patent No.: US 7,347,592 B2
(45) Date of Patent: Mar. 25, 2008

(54) LIGHT SOURCE FOR A PROJECTION SYSTEM HAVING A LIGHT ABSORPTION LAYER

(75) Inventors: Peter Mardilovich, Corvallis, OR (US); Kurt Ulmer, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 285 days.

(21) Appl. No.: 11/181,265

(22) Filed: Jul. 14, 2005

(65) Prior Publication Data

US 2007/0014991 A1    Jan. 18, 2007

(51) Int. Cl.
F21V 7/22 (2006.01)
F21V 9/04 (2006.01)
F21V 9/06 (2006.01)
G03B 21/28 (2006.01)

(52) U.S. Cl. .................. 362/341; 362/293; 353/98; 359/360; 359/614

(58) Field of Classification Search ......... 362/341, 362/257, 293, 296, 297, 514, 261, 294, 345, 362/327, 264; 205/71, 116; 353/98, 55; 359/359, 884, 360, 361, 584, 838, 321, 350, 359/601, 614, 885; 438/636; 350/1, 166, 350/290; 240/41.3; 313/113; 428/411.1, 428/823.1, 601, 613, 632, 650, 141, 144, 428/148, 457

See application file for complete search history.

(56) References Cited

U.S. PATENT DOCUMENTS

| | | | |
|---|---|---|---|
| 3,644,730 A * | 2/1972 | Ogle et al. | 362/345 |
| 3,645,600 A * | 2/1972 | Doctoroff et al. | 359/360 |
| 3,844,908 A | 10/1974 | Matsuo et al. | |
| 3,944,320 A * | 3/1976 | McLintic | 359/360 |
| 4,066,816 A | 1/1978 | Sheasby et al. | |
| 4,152,222 A | 5/1979 | Sheasby et al. | |
| 5,169,228 A * | 12/1992 | Breitzler | 362/293 |
| 5,251,064 A * | 10/1993 | Tennant et al. | 359/361 |
| 5,334,297 A | 8/1994 | Nakada et al. | |
| 5,977,694 A * | 11/1999 | McGuire | 313/110 |
| 6,114,807 A * | 9/2000 | Kavanagh | 313/570 |
| 7,004,604 B2 * | 2/2006 | Ohmae et al. | 362/268 |
| 7,063,423 B2 * | 6/2006 | Fujimori et al. | 353/55 |
| 2004/0150793 A1 * | 8/2004 | Chang et al. | 353/20 |

FOREIGN PATENT DOCUMENTS

| | | |
|---|---|---|
| DE | 2556146 | 3/1983 |
| EP | 0535457 | 4/1996 |

(Continued)

OTHER PUBLICATIONS

Solar Energy Materials and Solar Cells article entitled "AC anodization of aluminum, electrodeposition of nickel and optical property examination"; by L. Li, published Oct. 2000 (Netherlands).

(Continued)

*Primary Examiner*—John Anthony Ward
*Assistant Examiner*—David R Crowe

(57) ABSTRACT

A reflector for use in a projection system comprises an anodized metal substrate having a metal oxide layer. The metal oxide layer has a plurality of pores. A light absorbing pigment is deposited into each of the pores such that the light absorbing pigment and the metal oxide layer form a light absorbing layer on the metal substrate.

18 Claims, 2 Drawing Sheets

FOREIGN PATENT DOCUMENTS

| | | |
|---|---|---|
| GB | 1401067 | 7/1975 |
| JP | 82164249 | 3/1981 |
| JP | 57009899 | 1/1982 |
| JP | 58147592 | 9/1983 |
| JP | 05093296 | 4/1993 |
| WO | WO 9219795 A1 * | 11/1992 |

OTHER PUBLICATIONS

Hyomen Gijutsu (Journal of the Surface Finishing Society of Japan), article entitled "Black coloring treatment of aluminum anodic oxide film" by M. Sakaguchi, Apr. 1999 (Japan).

Zairyo Gijutsu (Material Technology), article entitled "Black Coloring of Porous Anodic Oxide Films on Aluminium by Electrophoresis of Carbon Black"; by S. Ito, Y. Nakahishi, N. Nakada, H. Hirono, published Jan, 1994 (Japan).

Journal of University of Science and Technology Beijing, entitled "Spectral Selective Solar Energy Absorbance of Electrolytically Colored Black Anodic Films on Aluminum"; by L. Li and Y. Yu, published 1990 (China).

Engineering (London); article entitled "A Breakthrough in Color"; published Sep. 1984.

Pechiney Group, article entitled "Effect of The Natural Environment on the Appearance of As-Processed Aluminum Surfaces"; published Oct. 1976; author, M. Reboul.

76/035177 JP, 1976, no author.

Dainichiseika Ltd., article entitled Coloring Aluminum (Alloy) Substrates, published Dec. 13, 1972. (Japan).

Alcan Research and Development Ltd., article entitled "Anodizing and Coloring Aluminum (Alloys)"; published Jul. 16, 1975. (Belgian).

Dainichi Seika Ltd., article entitled Aluminum and Alloy Sheet—Production of Pigmented Anodized Material, published Dec. 24, 1971 (Japan).

Trans. Inst. Met. Finish, article entitled "Long-term Outdoor Exposure of Anodic Coatings Coloured by Precipitation of Inorganic Pigments"; published 1981, author J.M. Kape & E.C. Mills.

Duke University; article entitled "Thermochemical and Spectroscopic Studies of Absorption (Thermochemical Studies)"; published 1989; Author Brenda Jean Hutchinson.

* cited by examiner

LIGHT SOURCE FOR A PROJECTION SYSTEM HAVING A LIGHT ABSORPTION LAYER

BACKGROUND

In a digital projection system, an image-bearing light beam is generated from a light source and ultimately cast onto a viewing surface. The light source commonly includes a mercury lamp, or other light filament, that is fixed within a reflective housing. The light source generates a light beam having wavelengths in the ultra-violet (UV), infrared (IR), and visible (VIS) ranges. In known projection systems, the housing is commonly made from glass and is coated with a reflective multi-layer optical coating that is designed to reflect light in the VIS range. Whether stray light from the light beam is reflected, absorbed, or transmitted through the light source is dependent on the type of incident light. For example, in some known reflectors stray light in the VIS range is generally reflected from the optical coating back into the light beam. Stray light in the UV and IR range, on the other hand, is generally absorbed by the glass housing or is transmitted into the projection system. However, it is advantageous for all of the UV and IR light to be absorbed by the reflective housing because stray light that is not absorbed generates excess heat in the projection system, requiring additional cooling mechanisms.

The embodiments described hereinafter were developed in light of this and other drawbacks associated with known glass reflectors in digital projection systems.

BRIEF DESCRIPTION OF THE DRAWINGS

The present embodiments will now be described, by way of example, with reference to the accompanying drawings, in which.

DETAILED DESCRIPTION

A light source for a projection system having a light absorption layer is provided. The light source includes an aluminum reflector with an aluminum substrate that is anodized, which forms a porous aluminum oxide layer on the surface of the substrate. The porous oxide layer is subsequently etched to increase the porosity of the oxide layer and to widen the diameter of the pores. After etching the pores are filled with a solution containing a light absorbing pigment. The solvent portion of the solution is removed, leaving behind pigmented particles in the pores of the aluminum oxide layer. Over the surface of the pigmented oxide layer, a glass decoupling layer and a multi-layer optical coating are applied. In this way, incident light to the reflector in the visible (VIS) range is reflected from the optical coating into the digital projection system, while light in the ultra-violet (UV) and infrared (IR) ranges are absorbed by the pigmented oxide layer. Therefore, there is no stray light that transmits past the reflector and into the projection system.

Figure 1:
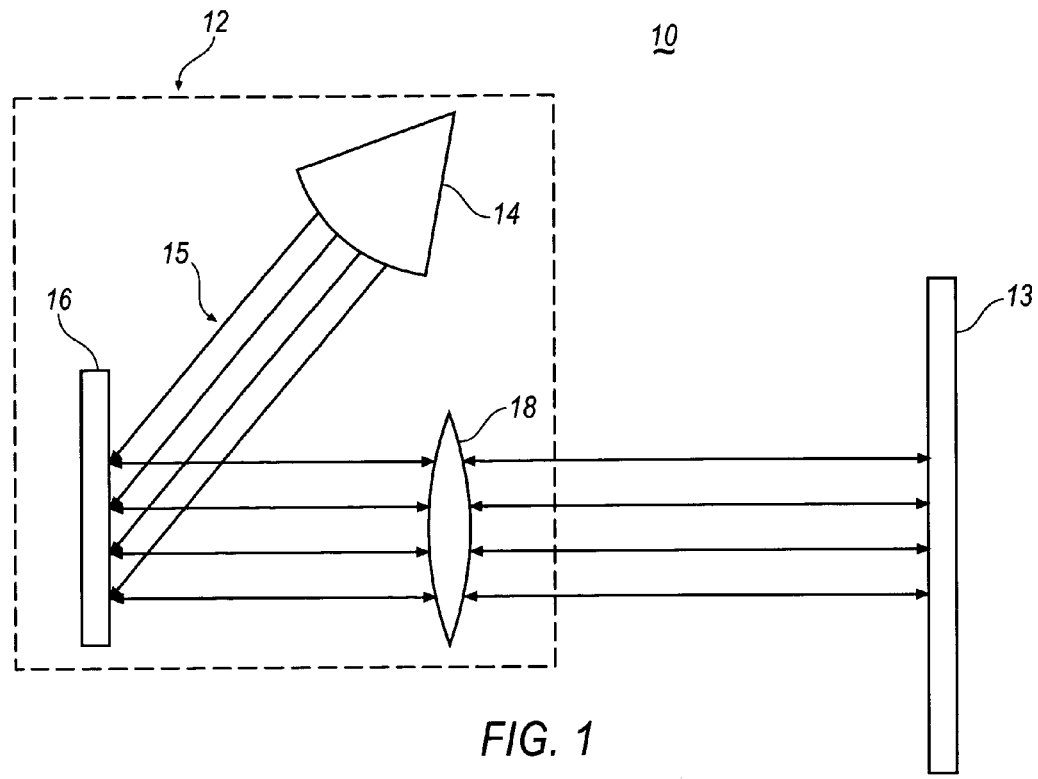
FIG. 1 illustrates an exemplary projection system.

FIG. 1 illustrates an exemplary digital projection system 10 including a light engine 12 and a viewing surface 13. The light engine 12 generally includes a light source 14, a spatial light modulator 16, and a set of projection optics 18. Light source 14 projects a light beam 15 onto the surface of the spatial light modulator 16, which in general comprises an array of pixel elements that are configured to modulate light beam 15 to generate a visible image that is substantially passed through the projection optics 18, and ultimately impinges upon viewing surface 13.

Figure 2:
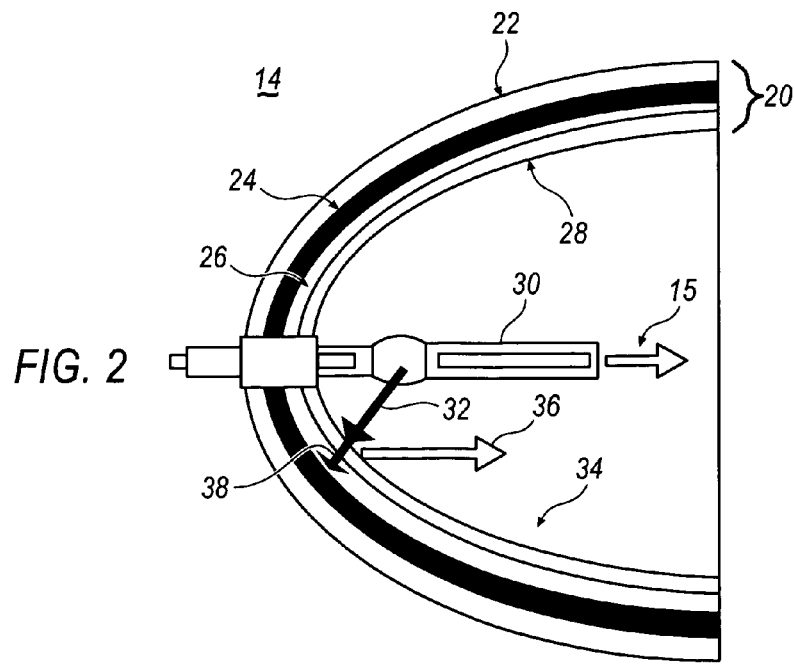
FIG. 2 illustrates an aluminum reflector according to an exemplary embodiment.

An enlarged view of an exemplary light source 14 is shown in FIG. 2. Light source 14 includes an aluminum reflector 20 having an aluminum substrate 22, an absorption layer 24, a glass decoupling layer 26, and a reflective multi-layer optical coating 28. Although in this embodiment aluminum is used as the material for the substrate, one of ordinary skill in the art understands that other metals such as aluminum alloys, titanium, tungsten or chromium, are also within the scope of this application. In addition substrate 22 may comprise multiple layers of aluminum or other metals. The glass decoupling layer 26 is applied to the absorption layer 24 to provide a smooth surface for the application of the reflective multi-layer optical coating 28.

Light source 14 further includes a light filament 30 that generates a light beam 15 containing light in the ultra-violet (UV), infrared (IR), and visible (VIS) wavelength ranges. As shown in FIG. 2, when light 32 containing all the wavelengths of light (i.e., ultra-violet, infrared, and visible) from filament 30 is incident to the inner surface 34 of reflector 20, the VIS portion 36 of the light is reflected by the optical coating 28 back into the light beam. The UV and IR portion 38 of the light penetrates through the optical coating 28 and the glass decoupling layer 26 to the absorption layer 24. The UV and IR portion 38 of the light is absorbed by the absorption layer 24, which prevents reflection of UV and IR light into the projection system 10. In this way, the UV and IR light 38, and any associated heat, is dispersed through the absorption layer 34 preventing excess heat from being introduced into the system 10.

Figure 3:
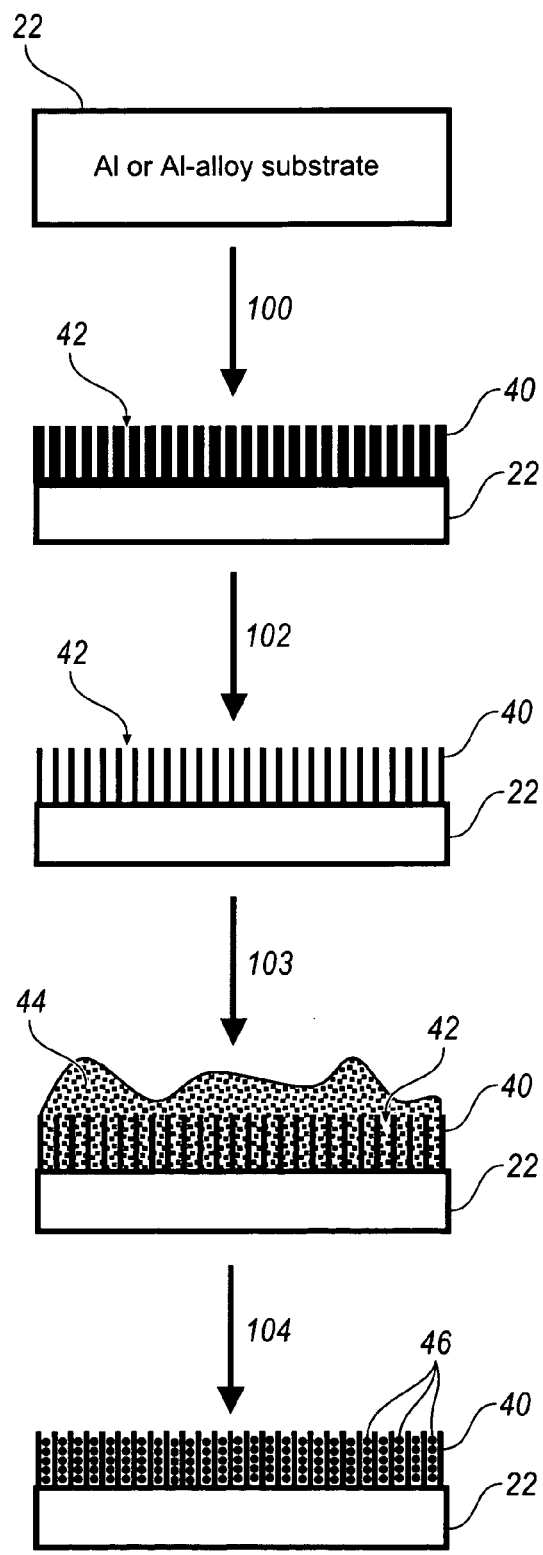
FIG. 3 is a process diagram according to an exemplary embodiment.

An exemplary method of forming an aluminum reflector 20 having an absorbing layer 24 is described below with reference to FIG. 3. First, an aluminum, aluminum alloy, or other metal substrate 22 is subjected to a known anodization process (e.g., the electrochemical oxidation of aluminum or an aluminum alloy where an oxidizable metal serves as the anode) that creates a porous aluminum oxide layer 40 on the aluminum, or aluminum alloy, substrate 22. (Step 100). The initial size of the pores created by anodization is dependent in part on the type of substrate, the chemicals used, the voltage applied during the process, the electrolyte concentration, and the temperature.

The formed aluminum oxide layer 40 provides a plurality of pores 42 having an initial diameter on the surface of the aluminum substrate 22. The pores 42 are then etched to provide increased porosity and to widen the diameter of the pores. (Step 102). The etching of the oxide layer is generally performed using diluted phosphoric acid, sodium hydroxide, or a mixture of phosphoric and chromium acids. One of ordinary skill in the art, however, understands that any solution that provides for controllable porosity and an increase in diameter is suitable.

Once the porosity and diameter of the pores 42 have been adjusted by the etching process, a light absorbing pigment solution 44 is deposited onto the surface of the aluminum oxide layer 40 such that the pores 42 in the aluminum oxide layer 40 are filled with the pigmented solution 44. (Step 103). The pigmented solution 44 is generally a combination of a solvent and a light absorbing pigment. The solvent can comprise any variety of substances including water or alcohol. The pigment may also include, for example, amorphous carbon black pigment, metal nano-particles, and organic dyes. Likewise, the amount, type, or percentage of pigment in the solution 44 can be adjusted to obtain desired absorption characteristics.

Excess solution 44 can then be removed from the oxide layer 40 surface. (Step 104). In addition, a drying process can be performed to eliminate excess moisture so that the only remaining residue in the pores 42 is the pigmented particles 46 that are embedded within each pore 42 of the aluminum oxide layer 40. Depending on the solution 44 deposited into the pores 42, a drying process may or may not be necessary. To obtain a higher percentage of pigmented particles 46 within each pore 42, the process of providing a solution 44 to the surface of the oxide layer 40 can be repeated until the desired level of pigmented particles 46 within each pore 42 is obtained. Before repeating the process of applying the solution, the previous layer of solvent and pigment should be completely dried. The combination of the anodized aluminum oxide layer 40, and the pigmented particles 46, creates the absorption layer 24.

After the absorbing layer 24 is formed, the rest of the reflector 20 may be formed according to various methods known in the art. For example, referring back to FIG. 2, a glass decoupling layer 26 is applied to the surface of the absorbing layer 24. The glass layer provides a smooth surface for the application of the multi-layer optical coating 28.

While the present invention has been particularly shown and described with reference to the foregoing preferred embodiment, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and system within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A projection system configured to project an image-bearing light beam onto a viewing surface, comprising:
   a spatial light modulator; and
   a light source configured to project a light beam onto said spatial light modulator, said light source including an anodized metal reflector having a light absorbing layer having a plurality of pores, said pores having a light absorbing pigment embedded within said pores;
   wherein said light absorbing pigment absorbs incident ultra-violet and infrared light from said light beam.

2. The projection system of claim 1, wherein said metal reflector further comprises
   a metal substrate;
   wherein said light absorbing layer is a metal oxide layer.

3. The projection system of claim 2, wherein each of said plurality of pores in said metal oxide layer are widened prior to embedding said light absorbing pigment.

4. The projection system of claim 2, wherein the diameter of each of said plurality of pores within said metal oxide layer varies.

5. The projection system of claim 2, wherein said metal substrate and said metal oxide layer include one of the following metals: aluminum, an aluminum alloy, tungsten, titanium, and chromium.

6. The projection system of claim 2, wherein said light absorbing pigment includes one of the following: an amorphous carbon black pigment, metal nano-particles, and an organic dye.

7. The reflector of claim 1, wherein the reflector is configured to reflect substantially all wavelengths of visible light in said light beam.

8. A reflector for use in a projection system, comprising:
   an anodized metal substrate having a metal oxide layer, said metal oxide layer having a plurality of pores; and
   a light absorbing pigment deposited into each of said plurality of pores, said light absorbing pigment and said metal oxide layer forming a light absorbing layer on said metal substrate;
   wherein said light absorbing layer absorbs incident light in the ultra-violet and infrared range.

9. The reflector according to claim 8, further comprising:
   a decoupling layer of glass overlaying said light absorbing layer; and
   a plurality of layers of an optical coating deposited onto said decoupling layer of glass.

10. The reflector according to claim 8, wherein said optical coating reflects incident light in the visible range.

11. The reflector of claim 8, wherein said anodized metal substrate and said metal oxide layer include one of the following metals: aluminum, an aluminum alloy, tungsten, titanium, and chromium.

12. The reflector of claim 8, wherein said light absorbing pigment includes one of the following: an amorphous carbon black pigment, metal nano-particles, and an organic dye.

13. A method of making a reflector for a projection system, comprising:
   forming a porous metal oxide layer by anodization on the surface of a metal substrate, said metal oxide layer having a plurality of pores;
   etching said porous metal oxide layer to increase porosity and to widen said pores to a predetermined diameter; and
   depositing a light absorbing pigment into said pores of said metal oxide layer to form a light absorbing layer on the surface of said metal substrate;

wherein said light absorbing layer is configured to absorb incident ultraviolet and infrared light.

14. The method according to claim 13, further comprising:

applying a layer of glass over said light absorbing layer; and applying a plurality of dielectric layers over said layer of glass.

15. The method according to claim 14, wherein said metal substrate and said metal oxide layer include one of the following metals: aluminum, an aluminum alloy, tungsten, titanium, and chromium.

16. The method according to claim 14, wherein said light absorbing pigment includes one of the following: an amorphous carbon black pigment, metal nano-particles, and an organic dye.

17. The method of claim 13, wherein the reflector is configured to reflect substantially all wavelengths of visible light in an incident light beam.

18. A reflector for use in a projection system, comprising:

a means for generating a light beam;

a means for reflecting incident visible light from said light beam; and a means for absorbing incident ultra-violet and infrared light from said light beam;

wherein said incident ultra-violet and infrared light does not penetrate through the reflector into the projection system; and wherein said means for absorbing incident ultra-violet and infrared light includes a plurality of pores, said pores having a light absorbing pigment embedded within said pores.

* * * * *